United States Patent
West et al.

(10) Patent No.: US 10,743,469 B2
(45) Date of Patent: Aug. 18, 2020

(54) ELECTRONIC SENSOR FOR MATERIAL COLLECTION SYSTEM

(71) Applicant: Superior Tech Inc., Ephrata, PA (US)

(72) Inventors: Brian W West, Ephrata, PA (US); Andrew J Zern, Millvale, PA (US)

(73) Assignee: Superior Tech Inc., Ephrata, PA (US)

( * ) Notice: Subject to any disclaimer, the term of this patent is extended or adjusted under 35 U.S.C. 154(b) by 281 days.

(21) Appl. No.: 15/974,170

(22) Filed: May 8, 2018

(65) Prior Publication Data

US 2019/0343046 A1    Nov. 14, 2019

(51) Int. Cl.
| | |
|---|---|
| *G08B 21/00* | (2006.01) |
| *A01D 43/063* | (2006.01) |
| *G08B 21/18* | (2006.01) |
| *G01F 23/26* | (2006.01) |
| *A01D 101/00* | (2006.01) |

(52) U.S. Cl.
CPC ....... *A01D 43/0631* (2013.01); *G01F 23/265* (2013.01); *G08B 21/182* (2013.01); *A01D 2101/00* (2013.01)

(58) Field of Classification Search
CPC ............ A01D 43/0631; A01D 2101/00; A01D 34/006; A01D 34/64; A01D 34/001; A01D 43/063; G08B 21/182
See application file for complete search history.

(56) References Cited

U.S. PATENT DOCUMENTS

| | | | | |
|---|---|---|---|---|
| 5,321,939 A * | 6/1994 | Fuse | ................... | A01D 43/0631 56/10.2 R |
| 5,605,066 A * | 2/1997 | Hurskainen | ........ | G07C 9/00182 70/277 |
| 5,960,613 A * | 10/1999 | Mixon | ............... | A01D 43/0631 56/10.2 R |
| 6,089,006 A * | 7/2000 | Langford | ............. | A01D 43/077 56/13.3 |
| 6,622,465 B2 * | 9/2003 | Jerome | ............. | A01D 43/0631 56/12.8 |
| 9,510,510 B2 * | 12/2016 | Holz | ................... | A01D 43/0631 |
| 10,588,260 B2 * | 3/2020 | Kuriyagawa | ........ | A01D 34/001 |

* cited by examiner

*Primary Examiner* — Toan N Pham

(74) *Attorney, Agent, or Firm* — Massina Patent & TM Law

(57) ABSTRACT

A material collection system sensor assembly for a material collection system including a collection container having a clipping receiving chamber and at least one wall with a generally rigid portion and a chute inlet defined in the generally rigid portion. The sensor assembly includes a capacitive sensor positioned on the generally rigid portion of an external side of the wall. The capacitive sensor creates an electric field that extends into the clipping receiving chamber. A microcontroller is associated with the sensor and at least one indicator. The microcontroller is configured to activate at least one indicator when clippings within the clippings chamber are consistently within the electric field and thereby trigger the capacitive sensor.

19 Claims, 4 Drawing Sheets

ELECTRONIC SENSOR FOR MATERIAL COLLECTION SYSTEM

FIELD OF THE INVENTION

This invention relates to a material collection system sensor. More particularly, the invention relates to an electronic sensor for a material collection system.

BACKGROUND OF THE INVENTION

A mower for grass, weeds, leaves and the like (hereinafter referred to as clippings) has a rotating cutter blade on the underside of it. The clippings are conveyed via a chute by an air flow due to rotation of the cutter blade. The clippings are received in a collection bin or bag for collection and disposal. In the prior art, various bin or bag fullness detection systems have been utilized, however, each has shortcomings.

Some prior art systems utilize a sight glass. The sight glass requires the operator to look rearward while mowing or collecting material to examine the sight glass. In dim light the sight glass is not usable. The environment is very dirty, and the sight glass will haze over time rendering the sight glass useless or requiring the sight glass to be replaced. This is a non-direct visual indication only.

Other systems utilize mechanical switches, however, pressure activated switches or displacement activated switches do not offer adjustability for the material type that is being collected. Wet grass will trigger a pressure activated switch sooner than dry leaves causing the sensor to trigger prior to the material bin being filled completely or not triggering and resulting in a plugged chute. The adjustable pressure activated switch in U.S. Pat. No. 9,510,510B2 rectifies this issue but requires the operator to exit the vehicle to adjust the sensor. A sensor mounted on the floor of the bin is susceptible to damage.

Fill sensors that work on air pressure or flow indicate that the bin is full once the bin is filled to the point where air flow is restricted. This can lead to overfilling and plugging of the chute if immediate action is not taken. Mechanical indicators such as the type mounted on the chute require the operator to frequently look at the sensor to determine if the bin is full. Since the sensor works on air pressure it indicates that the bin is full once the bin is completely full. Continuing to collect material will result in over filling and/or plugging the chute. Another issue with this technology is that the sensor cannot be adjusted for the weight of the material which affects air flow and pressure.

There is a need for a sensor that is easily adjustable based on the material being collected to ensure the sensor triggers when the bin is full, not under filled or over filled.

SUMMARY OF THE INVENTION

In at least one embodiment, the present invention provides a material collection system sensor assembly for a material collection system including a collection container having a clipping receiving chamber and at least one wall with a generally rigid portion and a chute inlet defined in the generally rigid portion. The sensor assembly includes a capacitive sensor positioned on the exterior wall of the generally rigid portion. The capacitive sensor creates an electric field that extends into the clipping receiving chamber. A microcontroller is associated with the sensor and at least one indicator. The microcontroller is configured to activate at least one indicator when clippings within the receiving chamber are consistently within the electric field and thereby trigger the capacitive sensor.

In at least one embodiment, the invention provides a material collection system for a vehicle. The material collection system includes a collection container having a clipping receiving chamber and at least one wall with a generally rigid portion and a chute inlet defined in the generally rigid portion. The sensor assembly includes a capacitive sensor positioned on the exterior wall of the generally rigid portion. The capacitive sensor creates an electric field that extends into the clipping receiving chamber. A microcontroller is associated with the sensor and at least one indicator. The microcontroller is configured to activate at least one indicator when clippings within the receiving chamber are consistently within the electric field and thereby trigger the capacitive sensor.

The sensor assembly described herein is impervious to the conditions that the sensor is used in and has a non-contact sensing method without any moving parts to wear, increasing the working the life of the sensor. In at least one embodiment, the sensor assembly provides audible alerts such that the operator is aware that the bin is full without looking at the sensor. The sensor assembly can also be configured to notify the machine when the bin is filled for additional actions taken by the machine.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
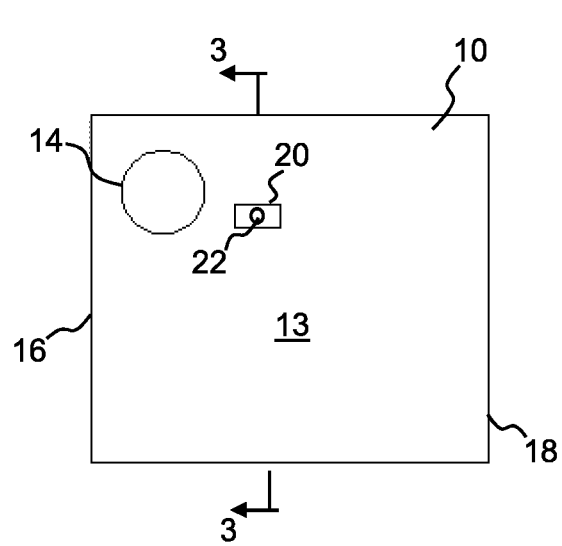
FIG. 1 is a front elevation view of a clippings collection bin incorporating a sensor assembly in accordance with an embodiment of the invention.
Figure 2:
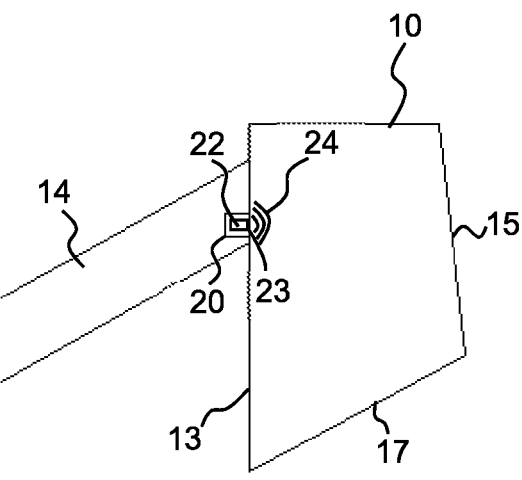
FIG. 2 is a side elevation view of the collection bin of FIG. 1.
Figure 3:
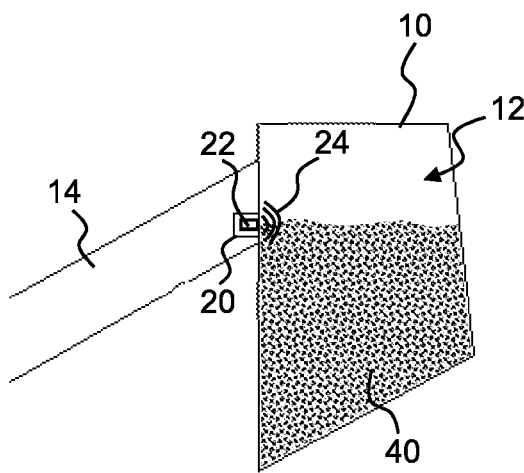
FIG. 3 is a cross-sectional view along the line 3-3 in FIG. 1.

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Referring to FIGS. 1-4, a material collection system sensor assembly 20 in accordance with an embodiment of the invention will be described. The material collection system sensor assembly 20 of the present embodiment is mounted on a clippings collection bin 10 which has an internal chamber 12 configured to receive clippings received through a chute 14. The collection bin 10 and chute 14 are mounted on a lawn and garden tractor with a mowing deck (not shown). It is understood that the material collection system sensor assembly 20 may be used on other types of grass mowing machines including but not limited to zero turning radius mowers. The collection bin 10 includes front and rear walls 13, 15, side walls 16, 18 and a bottom wall 17. One or more of the walls may include a mesh or other configuration which allows air flow therethrough. At least the upper portion of the front wall 13 is substantially rigid and provides a mounting surface for the sensor assembly 20 adjacent the chute opening into the collection bin 10. While the illustrated sensor assembly 20 is positioned adjacent the chute opening, it is understood that the sensor assembly 20 may be positioned at other locations on the collection bin 10.

The sensor assembly 20 includes a capacitive proximity sensor 22 to determine when the bin 10 is full. The sensor assembly 20 is mounted to the external surface of the collection bin 10 with the sensing surface 23 of the sensor 22 positioned along the front wall 13. The sensing surface 23 may be formed, for example, by two concentrically shaped metal electrodes of an unwound capacitor. The electrodes create an electric field 24 which passes through front wall 13 and extends into the chamber 12. When the clippings 40 within the chamber 12 are within the electric field 24, the presence of the clippings 40 changes the capacitance detected by the sensor 22. As a result, the output state of the sensor 22 changes when it detects a capacitance that is greater than the threshold set by the sensitivity adjustment 25. As will be described hereinafter, the operator can adjust the sensitivity of the sensor 22 in response to different material conditions of the clippings 40. The sensor 22 eliminates any direct contact between the material in the bin and the sensor element. The sensor 22 is impervious to conditions found in the collection bin such as dust and dirt.

When the output state of the sensor 22 changes, the sensor assembly 20 produces a visual and/or an audible alert to the operator that the bin 10 is full. The sensor assembly 20 may also provide a short reminder alert until the bin 10 is emptied. An audible alert keeps the operator from having to look at the sensor assembly for an indication of the fill level and allows the operator to stay focused on operating the vehicle.

Figure 4:
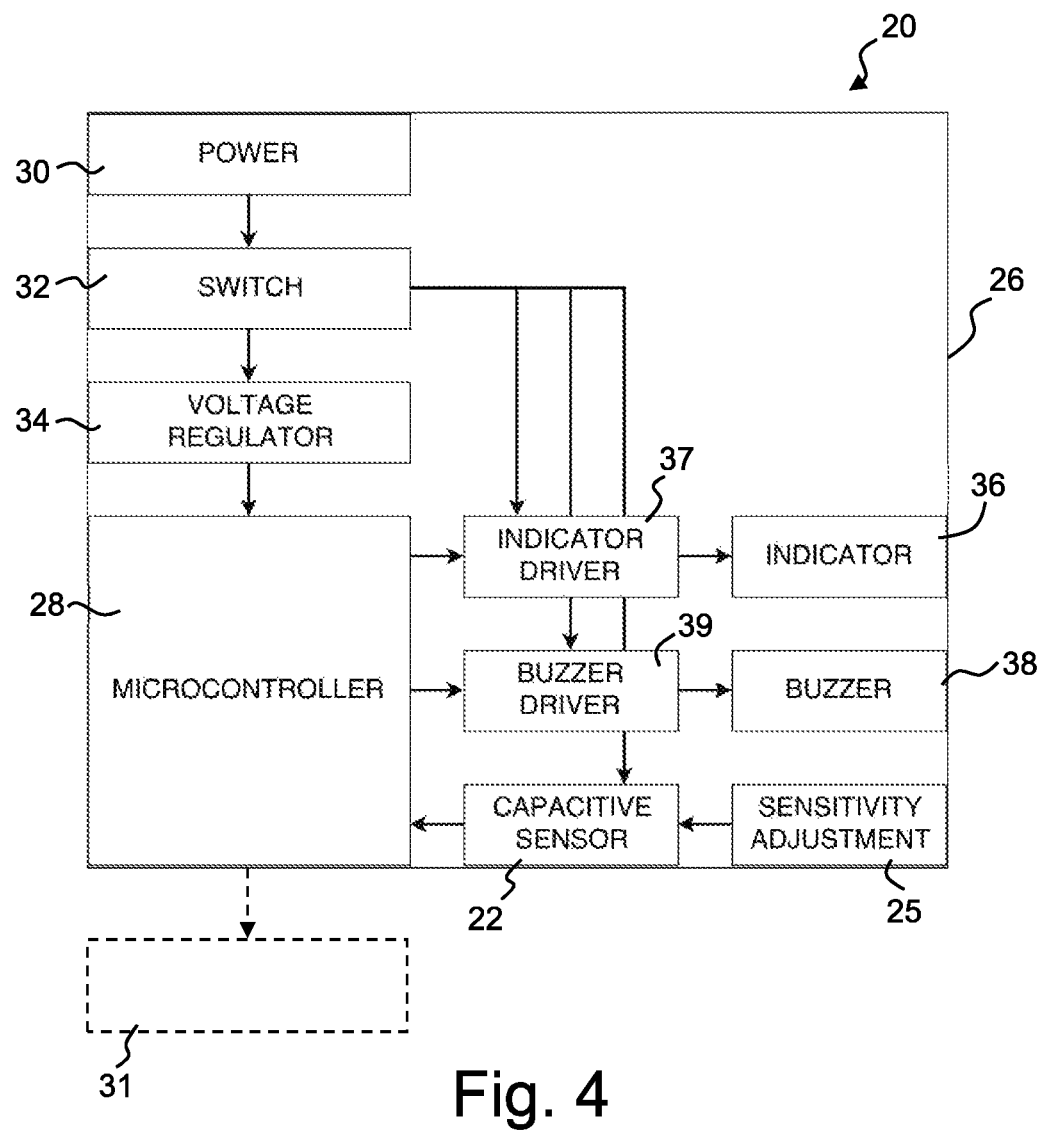
FIG. 4 is a block diagram of the sensor assembly in accordance with an embodiment of the invention.

Referring to FIG. 4, a block diagram of an illustrative sensor assembly 20 will be described. In the illustrated embodiment, the sensor assembly 20 is self-contained within a housing 26, however, it is understood that features and elements of the sensor assembly 20 may be external to the housing 26. The sensor assembly 20 includes a microcontroller 28 configured to control operation of the sensor assembly 20. The microcontroller 28 includes a memory to store data and instructions and a processor to execute the instructions and control the sensor assembly 20 in accordance therewith. The sensor assembly 20 includes a power source 30 configured to power the microcontroller 28 and the other elements of the assembly. The power source 30 may be an internal source as illustrated, e.g. an internal battery, or may be an external source, e.g. a take-off from the vehicle's power source. A switch 32 controls activation and de-activation of the sensor assembly 20 and a voltage regulator 34 is configured to regulate the voltage received from the power source 30 and to provide the correct voltage to the microcontroller 28.

As described above, the capacitive sensor 22 is positioned within the housing 26 and is positioned such that the sensing surface 23 of the sensor 22 is positioned along the front wall 13 when the sensor assembly 20 is mounted on the collection bin 10. Sensor 22 sensitivity can be adjusted by the operator for varying material conditions via a sensitivity adjustment 25. The sensitivity adjustment 25 is preferably electronically controlled such that the sensor 22 can be adjusted on the fly without any tools or without leaving the seat of the vehicle. It is understood that other adjustment means, for example a mechanical screw adjustment, may additionally or alternatively be provided. In another embodiment, the sensor 22 may automatically adjust for the characteristics of the material being collected. That is, the operator enters the material to be collected and any specific characteristics, e.g. wet or heavy grass, and the sensor adjustment 25 automatically adjusts the sensor 22 for that material and characteristics based on stored instructions.

In the illustrated embodiment, the sensor assembly 20 includes both a visual indicator 36 and an audible indicator 38. The visual indicator 36 may be a light, an image or the like and the audible indicator 38 may be a buzzer, a speaker or the like. The microcontroller 28 is configured to actuate an indicator driver 37, which in turn activates the visual indicator 36, upon receipt of a signal from the sensor 22 that the collection bin 10 is full. Similarly, the microcontroller 28 is configured to actuate an audible driver 39, which in turn activates the audible indicator 38, upon receipt of a signal from the sensor 22 that the collection bin 10 is full. The microcontroller may be configured to continuously actuate the drivers 37, 39 until the collection bin 10 is emptied or may actuate the drivers 37, 39 for only a predetermined amount of time. If the drivers 37, 39 are actuated for only a predetermined amount of time, the microcontroller may be configured to re-actuate the drivers 37, 39 periodically as a reminder until the collection bin 10 is emptied.

As illustrated in FIG. 4, the sensor assembly 20 may be connected to external components 31 through a wired or non-wired connection. For example, the sensor assembly 20 may have a wired connection to the vehicle data bus which allows the microcontroller 28 to provide fill level/status to the vehicle controller and instrumentation to provide a visual and/or audible notification on the vehicle. The microcontroller may also provide instructions to automatically control the vehicle, for example, reducing speed of the vehicle or stopping the cutting blades, in response to a full indication. As another example, the sensor assembly 20 may be wirelessly connected to a vehicle ECU which allows the microcontroller 28 to provide fill level/status to the vehicle controller and instrumentation to provide a visual and/or audible notification on the vehicle. As another example, the sensor assembly 20 may have a wireless connection to a mobile or wearable device configured to receive the fill level/status from the microcontroller 28. As a further example, the sensor assembly 20 may have a wireless connection to a cloud-based system/service configured to receive the fill level/status from the microcontroller 28. In each of these examples, the remote fill level/status may be in addition to or in place of the indicators 36, 38.

Figures 5, 6:
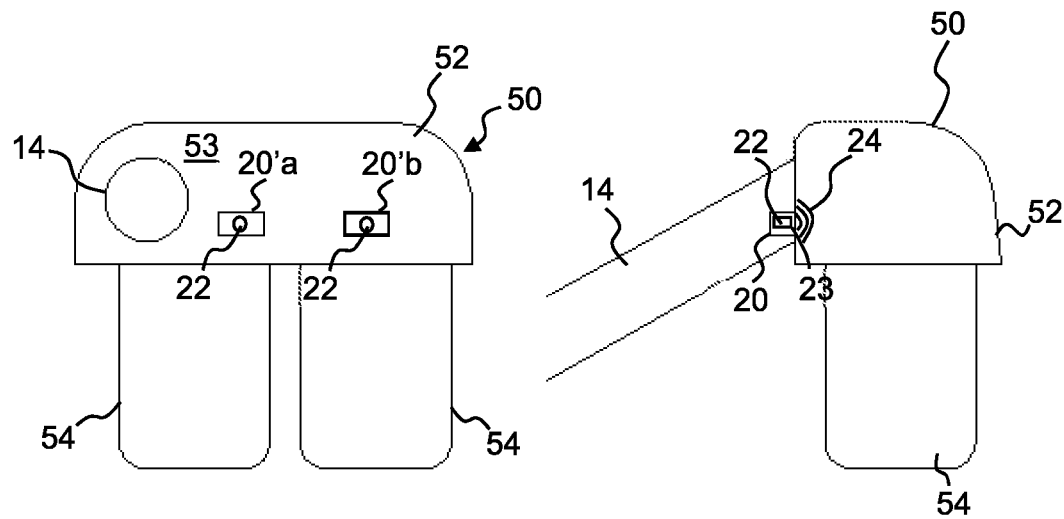
FIG. 5 is a front elevation view of a clippings collection bag assembly incorporating a sensor assembly in accordance with an embodiment of the invention.
FIG. 6 is a side elevation view of the bag assembly of FIG. 5.
Figure 7:
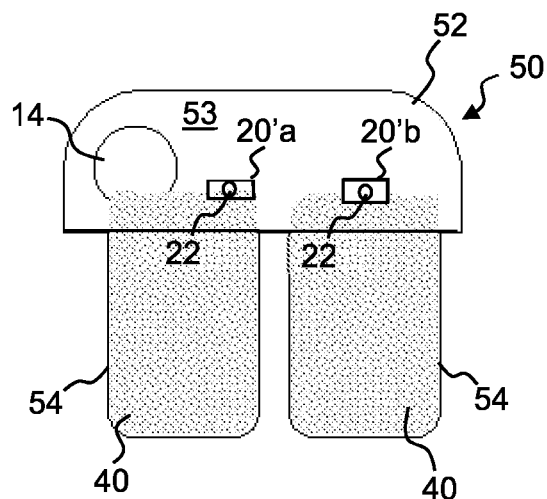
FIG. 7 is a front elevation view similar to FIG. 5 illustrating clippings within the bags of the bag assembly.

Referring to FIGS. 5-7, the material collection system sensor assembly 20' is utilized with a clippings bag system 50. The grass bag system 50 includes a substantially rigid hood 52 which receives the clippings chute 14. A plurality of clipping bags 54 are suspended below the hood 52 and receive the clippings 40 that enter the hood 52 through the chute 14. In the present embodiment, the sensor assembly 20' includes a sensor sub-assembly 20'a and 20'b aligned with each clipping bag 54. Each of the sensor sub-assemblies 20'a, 20'b includes a capacitive sensor 22, as described above, with its respective sensing surface 23 positioned along front wall 53 of the hood 52 and a respective electric field 24. Each sensor 22 is configured to detect when the respective bag 54 is filled with clippings 40 and to send a corresponding signal to the microcontroller 28. The microcontroller 28 of the present embodiment is configured to actuate the drivers 37, 39 upon receiving a signal from both of the sensors 22. This configuration prevents a false signal if the bags 54 fill unevenly and only one of the bags 54 is full. Preferably, only one of the sub-assemblies 20a' includes the microcontroller 28 and indicators 36, 38. The other sub-assembly 20b' would include a sensor 22 which is in communication, wired or wireless, with the microcontroller 28 in the other sub-assembly 20a'. In other respects, the sensor assembly 20' operates in the same manner as in the previous embodiment.

Figure 8:
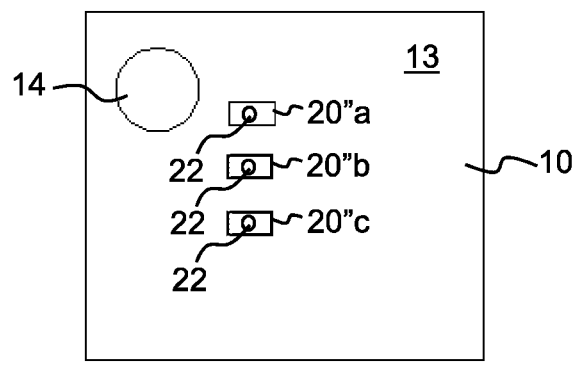
FIG. 8 is a front elevation view of a clippings collection bin incorporating a sensor assembly in accordance with another embodiment of the invention.

Referring to FIG. 8, a sensor assembly 20" in accordance with another embodiment will be described. The sensor assembly 20" includes multiple sensor sub-assemblies 20"a, 20"b and 20"c, each with a respective capacitive sensor 22. Each of the sensors 22 communicate with a microcontroller 28 positioned in one of the sub-assemblies 20"a. The sub-assemblies 20"a, 20"b, 20"c are mounted at different heights along the collection bin front wall 13, for example, at the half-way level, the three-quarter level, and the full level. Each sensor 22 is configured to send a signal to the microcontroller 28 when the clippings within the collection bin 10 are consistently within the electric field 24 of the respective sensor 22. The microcontroller 28 is configured to recognize the position of each sensor 22 and to provide a corresponding indication representative of the signal received. Upon receipt of a signal from the sensor 22 of sub-assembly 20"c, the microcontroller will actuate the drivers 37, 39 to provide a half full indicator, for example, a single short beep and an image showing half the image field full. Upon receipt of a signal from the sensor 22 of sub-assembly 20"b, the microcontroller will actuate the drivers 37, 39 to provide a three-quarter full indicator, for example, two short beeps and an image showing three-quarters of the image field full. Upon receipt of a signal from the sensor 22 of sub-assembly 20ac, the microcontroller will actuate the drivers 37, 39 to provide a full indicator as described in connection with the first embodiment.

Figure 9:
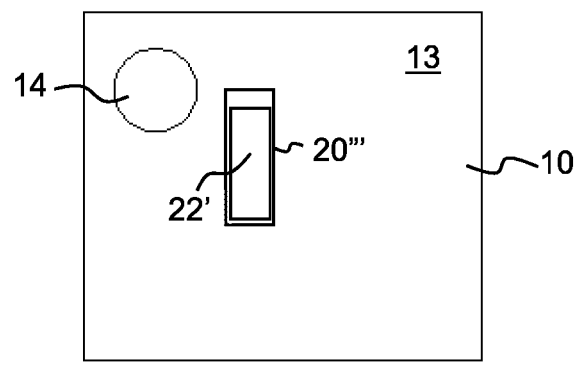
FIG. 9 is a front elevation view of a clippings collection bin incorporating a sensor assembly in accordance with another embodiment of the invention.

Referring to FIG. 9, a sensor assembly 20''' in accordance with another embodiment will be described. The sensor assembly 20''' is similar to the previous embodiment and provides indicators for different levels of fullness. In the present embodiment, the sensor assembly 20''' includes a single sensor 22' having a length extending from a half-way level to a full level. The microcontroller is configured to recognize which area of the sensor 22' is triggered and to provide an indicator corresponding thereto. In other respects, the sensor assembly 20''' operates in a manner similar to that of the previous embodiment.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A material collection system sensor assembly, the material collection system including a collection container having a clipping receiving chamber and at least one wall with a generally rigid portion and a chute inlet defined in the generally rigid portion, the sensor assembly comprising:
   a capacitive sensor positioned on the generally rigid portion on an external side of the wall, the capacitive sensor creating an electric field that extends into the clipping receiving chamber;
   at least one indicator; and
   a microcontroller associated with the sensor and the at least one indicator, the microcontroller configured to activate the at least one indicator when clippings within the clippings chamber are consistently within the electric field and thereby trigger the capacitive sensor.

2. The material collection system sensor assembly of claim 1 wherein the at least one indicator is an audible indicator.

3. The material collection system sensor assembly of claim 1 wherein the at least one indicator is a visual indicator.

4. The material collection system sensor assembly of claim 1 wherein the at least one indicator includes an audible indicator and a visual indicator.

5. The material collection system sensor assembly of claim 1 wherein the capacitive sensor, the microcontroller and at least one indicator are housed within a housing which is configured to be mounted on the generally ridged portion with a sensing surface of the capacitive sensor positioned along the wall.

6. The material collection system sensor assembly of claim 1 further comprising at least a second capacitive sensor in communication with the microcontroller.

7. The material collection system sensor assembly of claim 1 wherein the capacitive sensor has a sensing surface which extends from a half-way level to a full level of the collection container.

8. The material collection system of claim 1 wherein the at least one indicator is an audible indicator, a visual indicator or both an audible indicator and a visual indicator.

9. The material collection system of claim 1 wherein capacitive sensor, the microcontroller and at least one indicator are housed within a housing which is configured to be mounted on the generally ridged portion with a sensing surface of the capacitive sensor positioned along the wall.

10. A material collection system for a vehicle, the system comprising:
   a collection container mountable on the vehicle, the collection container having a clipping receiving chamber and at least one wall with a generally rigid portion and a chute inlet defined in the generally rigid portion; and
   a sensor assembly including:
     a capacitive sensor positioned on the generally rigid portion on an external side of the wall, the capacitive sensor creating an electric field that extends into the clipping receiving chamber;
     at least one indicator; and
     a microcontroller associated with the sensor and the at least one indicator, the microcontroller configured to activate the at least one indicator when clippings within the clippings chamber are consistently within the electric field and thereby trigger the capacitive sensor.

11. The material collection system of claim 10 wherein the collection container is a collection bin.

12. The material collection system of claim 11 wherein the sensor assembly includes a plurality of capacitive sensors positioned at different heights along the at least one wall and wherein the microcontroller is configured to activate the at least one indicator to indicate a current fill status in response to which of the plurality of sensors is activated.

13. The material collection system of claim 11 wherein the capacitive sensor has a sensing surface which extends from a half-way level to a full level of the collection container and the microcontroller is configured to activate the at least one indicator to indicate a current fill status in response to which area of the sensor is activated.

14. The material collection system of claim 10 wherein the collection container is a clippings bag assembly including at least two clipping bags.

15. The material collection system of claim 14 wherein the sensor assembly includes a plurality of capacitive sensors with one of the capacitive sensors aligned with each of the clipping bags and wherein the microcontroller is configured to activate the at least one indicator only if each of the capacitive sensors are activated.

16. The material collection system of claim 10 wherein the sensor assembly is connected to a data bus of the vehicle and the microcontroller provides fill level/status to a controller and instrumentation of the vehicle.

17. The material collection system of claim 10 wherein the sensor assembly is wirelessly connected to an ECU of the vehicle and the microcontroller provides fill level/status to a controller and instrumentation of the vehicle.

18. The material collection system of claim 10 wherein the sensor assembly is wirelessly connected to a mobile device configured to receive fill level/status information from the microcontroller.

19. The material collection system of claim 10 wherein the sensor assembly is wirelessly connected to a cloud-based system/service to receive fill level/status information from the microcontroller.

* * * * *